A. A. BARBER.
PHOTOGRAPHIC FILM CARRIER.
APPLICATION FILED SEPT. 17, 1921.
1,429,270.
Patented Sept. 19, 1922.
6 SHEETS—SHEET 2.
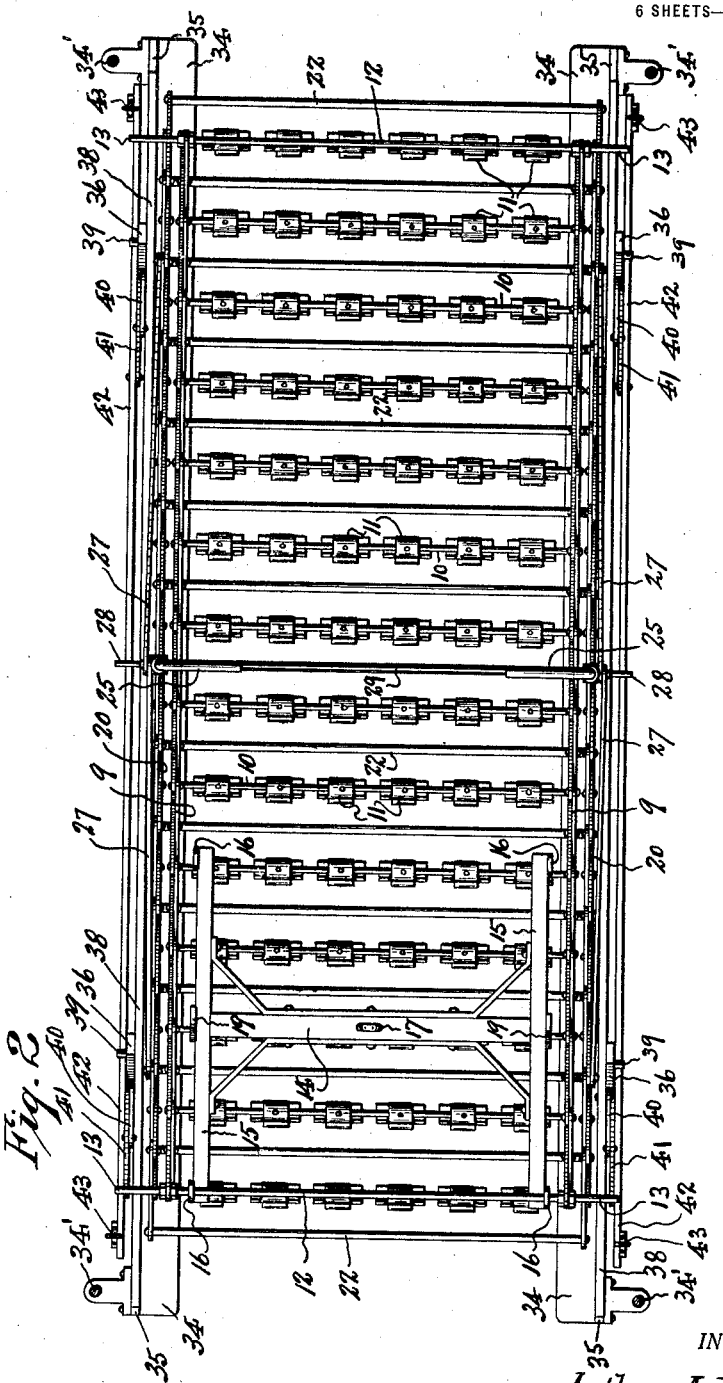
INVENTOR.
BY Anthony A. Barber,
ATTORNEYS.

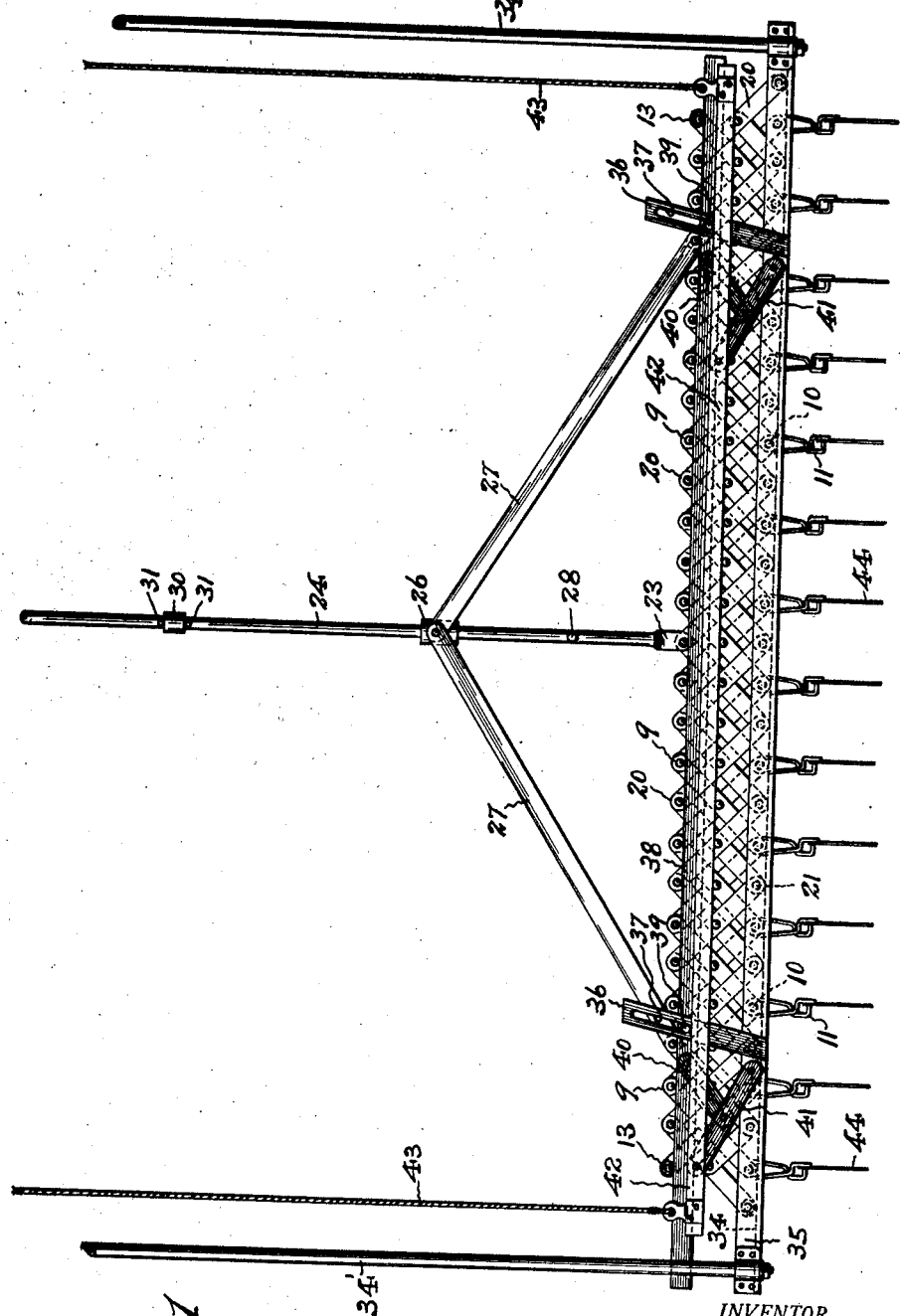

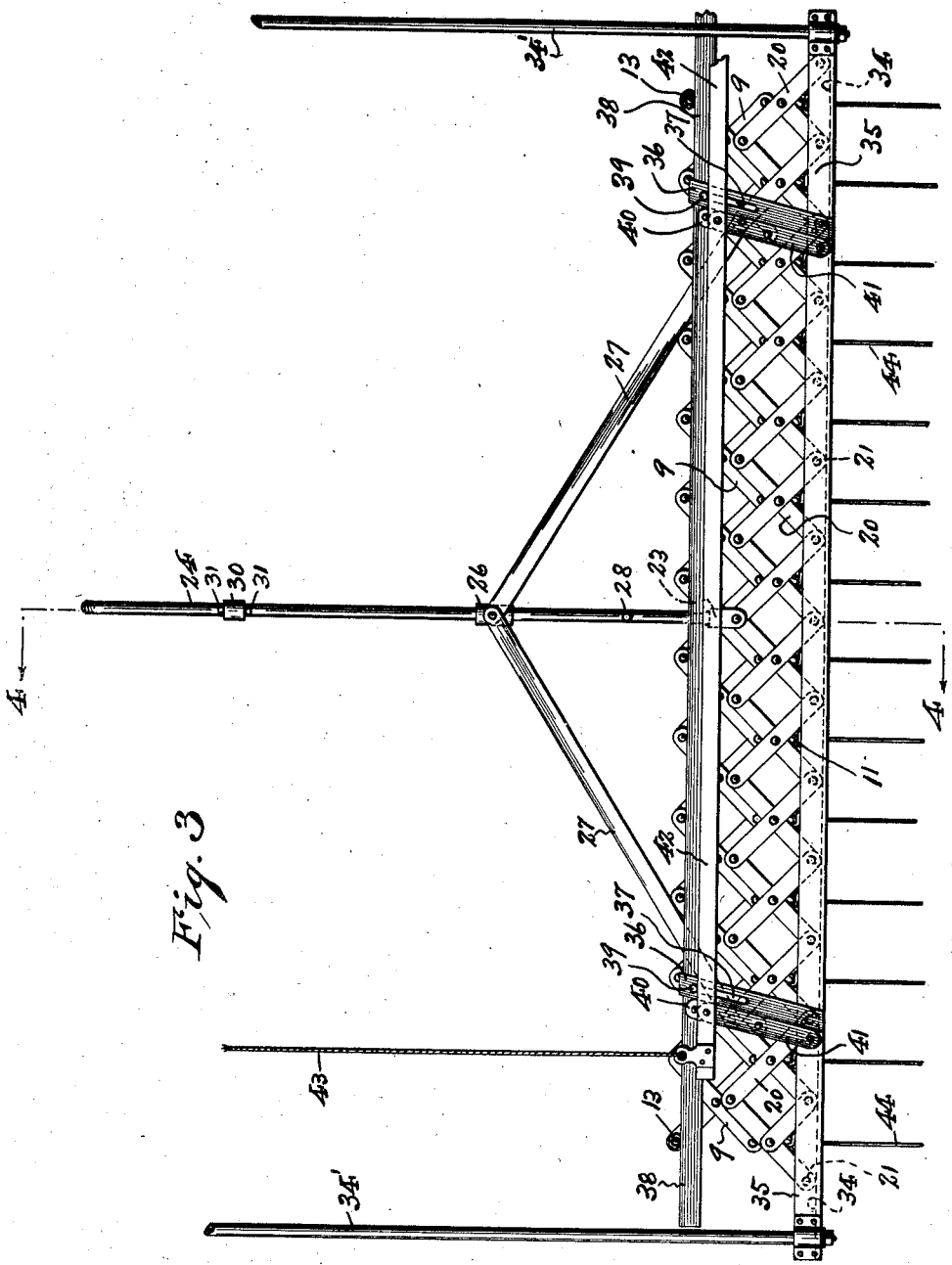

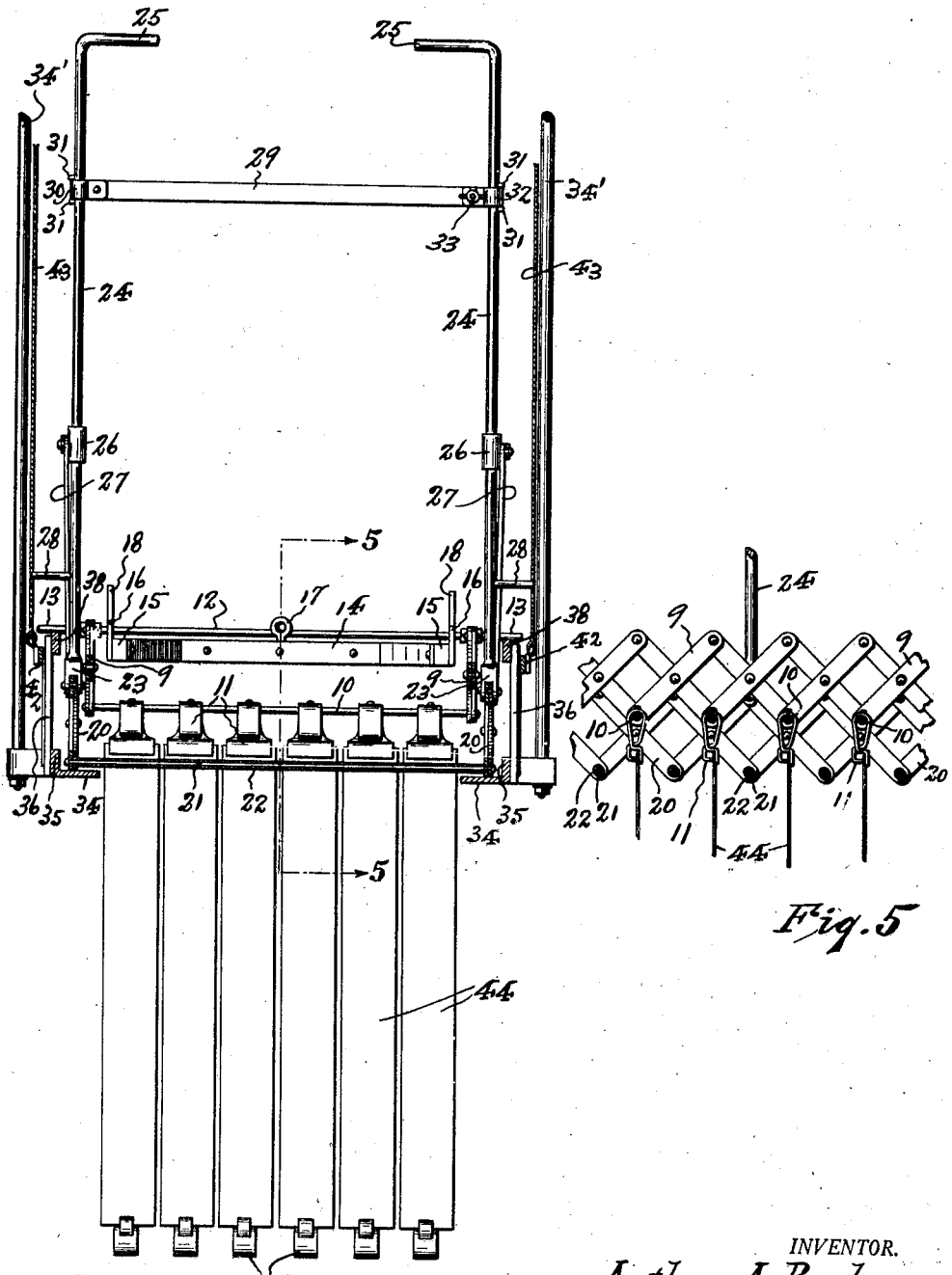

A. A. BARBER.
PHOTOGRAPHIC FILM CARRIER.
APPLICATION FILED SEPT. 17, 1921.

1,429,270.

Patented Sept. 19, 1922.
6 SHEETS—SHEET 5.

INVENTOR.
Anthony A. Barber,
BY
Frantz and Richards,
ATTORNEYS.

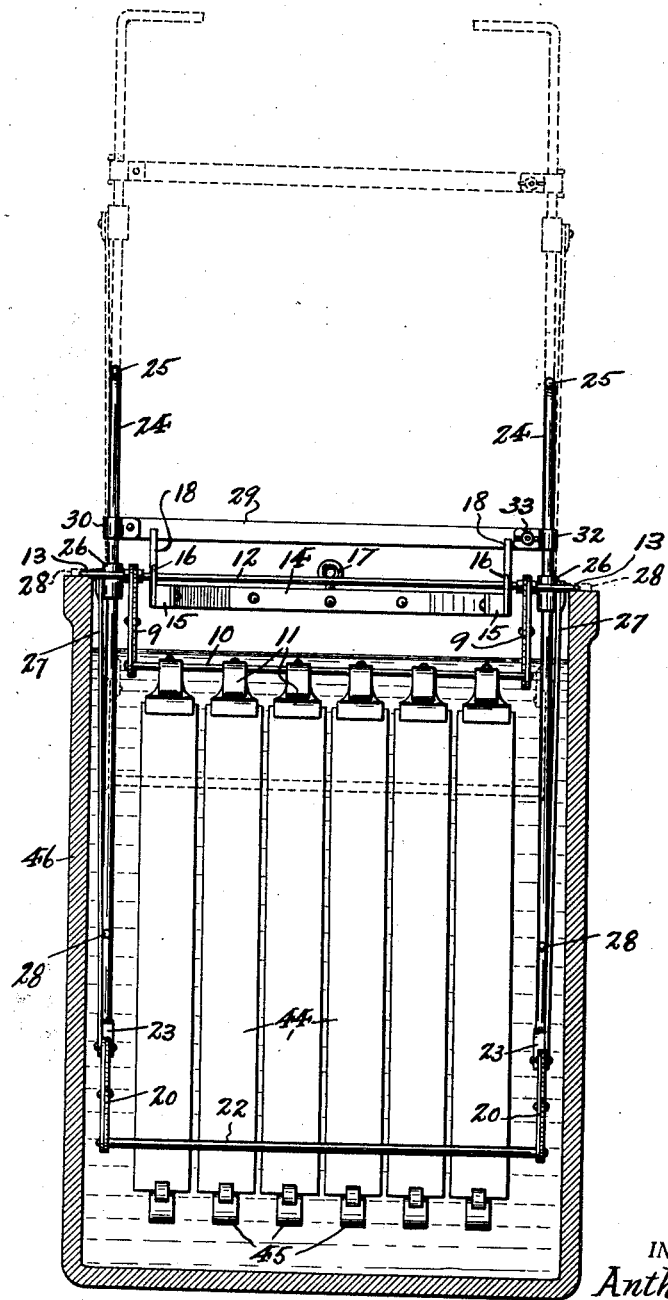

Patented Sept. 19, 1922.

1,429,270

UNITED STATES PATENT OFFICE.

ANTHONY A. BARBER, OF ARLINGTON, NEW JERSEY, ASSIGNOR TO B. & B. PHOTO-GRAPHIC CO., OF NEWARK, NEW JERSEY, A CORPORATION OF NEW JERSEY.

PHOTOGRAPHIC-FILM CARRIER.

Application filed September 17, 1921. Serial No. 501,373.

*To all whom it may concern:*

Be it known that I, ANTHONY A. BARBER, a citizen of the United States, residing at Arlington, in the county of Hudson and State of New Jersey, have invented certain new and useful Improvements in Photographic-Film Carriers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in photographic film developing apparatus; and the invention has reference, more particularly, to a novel construction of film supporting means or carrier, together with a loading rack therefor, the same being adapted to support a large number of film strips subject to developing and drying operations, whereby large quantities of films may be handled at one time expeditiously, and without likelihood of injuring or marring the films.

The invention has for its principal object to provide a simple, easily manipulated and large capacity film supporting means or carrier, which is particularly adapted to the purposes of finishers of amateur films, whereby a large number of films may be developed and made ready for printing with a minimum expenditure of time and labor, and with a minimum risk of injury to the films.

Another object of the invention is to provide in combination with the novel supporting means or carrier, a novel loading rack, whereby the operations of attaching the films to the former is greatly expedited, and whereby the films may be arranged in such a manner, that identification marks upon the films themselves are rendered unnecessary, but their identity is determined by their position as attached to the supporting means or carrier.

Other objects of this invention, not at this time more particularly enumerated, will be clearly understood from the following detailed description of the same.

With the various objects of this invention in view, the same consists, primarily, in the novel construction of photographic film developing apparatus, hereinafter set forth; and the invention consists, furthermore, in the novel arrangements and combinations of the various devices and parts, as well as in the details of the construction of the same, all of which will be hereinafter more fully described, and then finally embodied in the appended claims.

The invention is clearly illustrated in the accompanying drawings, in which:—

Figure 1 is a side elevation of the novel film carrier arranged in its initial opened out position upon the loading rack, with the film gripping devices or clips in lowered and separated position ready to receive the attachment of the films thereto.

Figure 2 is a plan or top view of the film carrier and loading rack, as positioned in said Figure 1.

Figure 3 is a side elevation of the film carrier arranged in its opened out position upon the loading rack, the latter having been operated to raise the film gripping devices or clips above the separator rods preparatory to closing up the carrier to its contracted condition; Figure 4 is a detail transverse vertical section, taken on line 4—4 in said Figure 3.

Figure 5 is a fragmentary central longitudinal section through the carrier alone, taken on line 5—5 in said Figure 4.

Figure 8 is a transverse section of the carrier and its parts in operative relation to a developing tank.

Similar characters of reference are employed in all of the hereinabove described views, to indicate corresponding parts.

Figure 6:
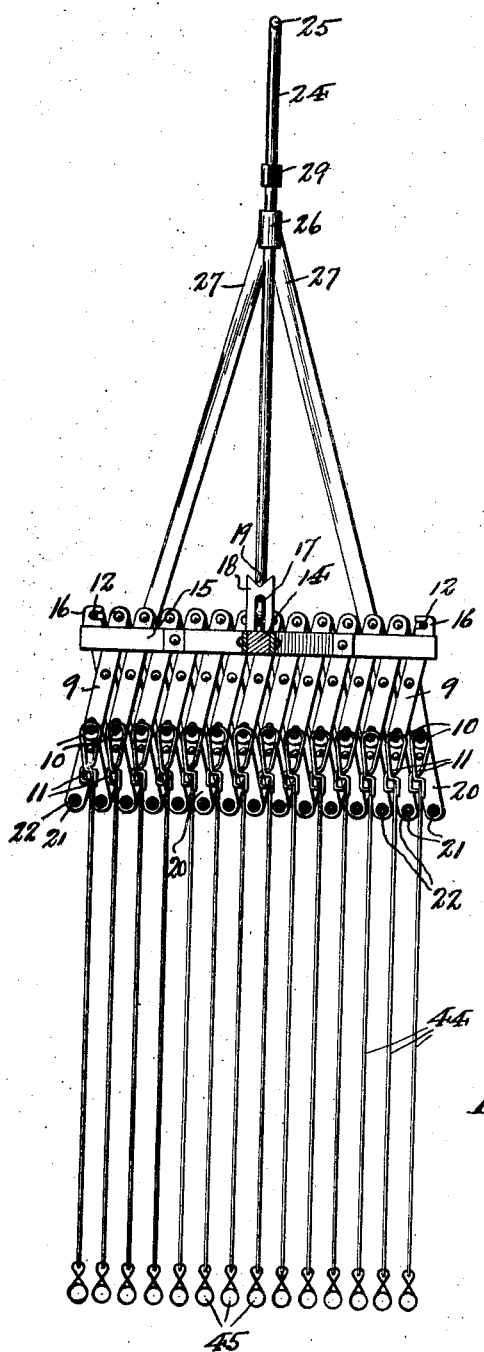
Figure 6 is a central longitudinal section through the carrier alone, the same being shown in its closed or contracted condition.

Referring now to said drawings, the novel film supporting means or carrier comprises a clip frame consisting of a pair of laterally opposed longitudinally extensible side-members 9, preferably made in the form of interconnected crossed levers arranged to perform a lazy-tong movement, so as to permit of a longitudinal extension or contraction of the clip frame as desired. Connected with the lower edges of said side members 9 are a plurality of transverse supporting rods 10 to which are suitably secured and suspended a series of film gripping devices or clips 11, arranged to provide a lateral row of clips on each supporting rod extending between said side members 9. Connected with the upper edges of said side members 9, at each end of the latter, are tie-rods 12; said tie-rods having their ends respectively projecting outwardly from the outer sides of the respective side members 9, to thereby provide suspension arms 13.

Arranged for cooperation with said clip frame is a lifting frame 14 having side pieces 15 of a length approximating the length of the clip frame when the latter is in its closed or contracted condition. Rigidly connected with the ends of said side pieces 15 are hook-plates or catches 16. Said hook-plates or catches are adapted to engage with the respective tie-rods 12, at points intermediate the side members 9, when the latter are closed or contracted, to thus attach the lifting frame in operative relation to the clip frame (as shown more particularly in Figures 6 and 7). Said lifting frame 14 is provided with a centrally disposed upwardly projected eye-piece 17, to which may be attached any suitable hoisting tackle for lifting the film supporting means or carrier. Said lifting frame is further provided at each side, intermediate the ends of said side pieces 15, with upwardly projecting lugs 18 having indented or bifurcated free ends 19, for purposes subsequently to be disclosed.

Associated with said clip frame is a separator frame consisting of a pair of laterally opposed longitudinally extensible side members 20, preferably made in the form of interconnected crossed levers arranged to perform a lazy-tong movement, so as to permit of a longitudinal extension or contraction of said separator frame in company with a corresponding movement of said clip frame. Said side-members 20 are spaced laterally apart so as to permit the clip-frame to move downwardly between the same. Connected with the lower edges of said side members 20 are a plurality of transverse separator rods 21, which are preferably provided with a tubular covering 22 of non-abrading material, such, e. g. as soft rubber or the like. When the clip frame and separator frame are arranged together in cooperative association, the separator rods 21 of the latter are disposed in alternated or intermediate relation to the clip supporting rods 10 of the former. Connected with the upper edge of each side-member 20, at a central point intermediate its ends, by means of a shackle-yoke 23, is an upwardly extending side rod 24, having at its upper end a transverse handle portion 25. Slidable on each side rod 24 is a slide-block 26. Pivotally interconnected between said slide blocks 26 and outlying points of the upper edges of the side-members 20 are oppositely extending outrigger links 27. Said side rods 24 possess a swiveling relation to said shackle-yokes 23, whereby the same may be turned on their longitudinal axes. Suitably connected with the side rods 24, adjacent to their lower ends, are transversely projecting suspension arms 28. Said side rods are normally interconnected together, adjacent to their upper ends by a cross-bar 29, which is pivotally connected by one end to swivel collar 30 mounted on one side rod between upper and lower stoppins 31 and which is connected at its opposite end to a swivel collar 32, mounted on the opposite side bar 24, by a suitable break-joint or coupling means 33.

The film supporting means or carrier above described is preferably used in connection with an especially constructed loading rack. This loading rack comprises a pair of longitudinal laterally opposed rack-rails 34, having vertical side flanges 35 at their outward edges. Said rack-rails are preferably supported from the ceiling by hanger rods 34'. Secured to said side flanges 35 of each rack-rail 34 are a pair of upright guides 36 having longitudinal slots 37. Said guides 36 are preferably canted rearwardly to incline somewhat from a true perpendicular. Vertically movable on the inner sides of said guides 36 are elevator rails 38, having studs 39 arranged to ride in the slots 37 of said guides. Said elevator rails 38 are respectively interconnected with the vertical side flanges 35 of each rack-rail 34 by toggle-lever members 40 and 41. Connected with the free end of the toggle-lever members 41 of each elevator rail is a longitudinal lift-bar 42, which is operated by pulley cords 43 running on overhead pulleys (not shown), the latter being preferably connected together for simultaneous operation. A pulling force exercised upon said pull-cords 43 raises the lift-bar 42, whereby the toggle-lever members 41 are swung upwardly to exert an upwardly transmitted push upon the toggle lever member 40 so that the elevator rails 38 are moved to elevated position. The toggle-lever members, when actuated, come to rest against the rearwardly canted guides 36, thus being stopped against collapse resulting in an untimely lowering of the elevator rails 38, and consequently said elevator rails remain in raised position until manually returned to normal initial lowered position.

In operation, the carrier is first deposited upon the loading rack, the same being lowered down upon the latter so that the clip frame and the separator frame are horizontally alined and supported by the rack-rails 34. The clip frame and separator frame are respectively extended or opened out longitudinally as shown in Figures 1 and 2. When thus arranged the transverse rows of clips are widely separated one from another, so that easy access may be gained to each individual clip, while at the same time the gripping or lower ends of the clips are positioned beneath the level of the separator rods of the separator frame, which lie intermediate the adjoining rows of clips, so that said separator rods offer no interference to the operation of attaching the films 44 to the clips. When the carrier is thus associated with the loading rack, the suspension arms 13 of the clip frame are engaged over the elevator rails 38.

When the carrier is thus made ready for the attachment of the films thereto, the dark room in which the loading rack and developing tanks are situated is shut against the entrance of light, and the operator begins to load the carrier. In amateur finishing work each order, consisting of one or more rolls of films to be developed, is placed in a separate properly identified envelope, and these envelopes are taken to the dark room, usually in a receptacle in which the envelopes are placed in a desired consecutive relation. The operator, takes the first envelope, removes the film rolls therefrom, breaks the roll and unwinds the film, and attaches one end of the film to the left-hand clip of the first row of clips. The films as they are removed from the envelopes, are successively attached to the clips working from left to right of each row of the latter, and from row to row until the entire batch of orders is disposed of, and the carrier is loaded. It will be apparent that the films will occupy a position in succession corresponding to the successive order of the envelopes from which they are taken, and consequently the films do not require to be identified by any mark or means directly applied thereto. After the films are developed and dried they are successively removed from the carrier in the same order in which they were attached, and after each film is cut to separate the picture sections, the same are returned to the envelopes which have been so handled as to retain their original consecutive order. As each film is attached to a clip 11, so as to hang therefrom a weight clip 45 is attached to its lower end to hold the same in straight downwardly hanging position.

Figure 7:
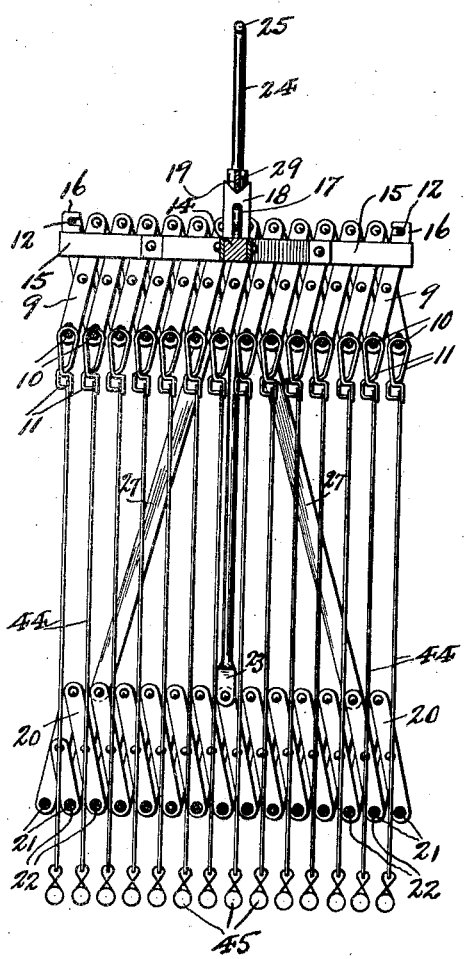
Figure 7 is a view similar to that shown in Figure 6, but illustrating the carrier with its clip frame raised relative to its separator frame, thus showing the position of the loaded carrier and its parts when ready to be moved to the developing tank.

After the carrier has been loaded, the operator grasps the actuating means for the pull cords 43, and operates the same whereby the pull cords lift up said lift-bars 42 to actuate the toggle-lever members 40 and 41, whereby the elevator rails 38 are moved to raised position. The upward movement of the elevator rails 38, by reason of their engagement with the suspension arms 13 of the clip-frame, impart a lifting movement to the latter, which draws up the clips 11 above the adjoining separator rods 21, which operation arranges the loaded carrier in the position shown in Figures 3, 4 and 5. The loaded carriage is now ready to be closed up. The operator pushes upon the ends of the clip frame and the separator frame, thus causing the extensible sides thereof to collapse, and closes compactly together the rows of clips 11, with the separator rods 21 positioned intermediate adjoining films (as shown in Figure 6). The carrier is locked in such closed up or contracted condition by engaging the hook-plates or catches 16 at each end of the lifting frame 14 with the respective tie-rods 12 (also shown in Figure 6). The loaded carrier is now ready to be hoisted up and swung over to a developing tank. To this end a suitable tackle (not shown) is attached to the eye-piece 17 of the lifting frame 14, and a hoisting movement is then inaugurated. This hoisting movement first raises the clip frame until the bifurcated ends 19 of the lugs 18 engage with the cross bar 29 of the separator frame (as shown in Figure 7), whereupon the whole carrier is lifted and swung clear of the loading rack.

The carrier is now conveyed to a suitable developing tank 46, and is let down into the same until the suspension arms 13 of the clip frame engage the margins of said tank, thus supporting the loaded carrier within the tank, with the attached film strips submerged in the developing fluid, as shown in Figure 8. In order to prevent the films from adhering together, and for the purpose of dislodging air-bells or bubbles from the surfaces of the film strips, all of which tends to produce spotting, marring or other injury to the negative surface, which cause blemishes in the photo-prints subsequently produced therefrom, the separator frame is rendered vertically movable, so that the separator rods 21 may be carried up and down between the submerged film strips. This up and down movement of the separator frame and its separator rods is effected by grasping the handle portions 25 of the side rods 24, and turning the latter axially to dispose the suspension arms 28 parallel to the sides of the tank, whereupon the side rods may be moved vertically up and down to alternately raise and lower the separator frame and its separator rods as often as desired. The up and down movement thus imparted to the separator rods causes the same to pass between adjoining rows of film strips to thereby separate any film strips adhering one to another, and at the same time slightly agitating both the developer and the film strips to break air-bells or bubbles adhering to the latter, whereby the same are dislodged so that the developer freely acts upon all points of the surfaces of said film strips, and consequently perfect development of the film is assured. If it is desired the separator frame and separator rods may be held in upwardly raised positions, by turning the side rods 24 to project the suspension arms 28 transversely across the margins of the tank, as indicated by dotted lines in Figure 8.

After the films are developed, the same are removed from the developing tank 46 by hoisting up the carrier, and thereupon the carrier with the films may be moved to a tank containing a fixing bath, and associated and operated in connection therewith in the same manner as above described. From the fixing bath tank, the carrier is moved to a washing tank, and from the washing tank to a drying room, wherein the carrier with the films are permitted to remain until the latter are thoroughly dry, whereupon the carrier may be removed and unloaded, the films being removed therefrom, cut and returned to the proper original envelopes, as already above referred to. In some instances it is deemed desirable to remove the separator frame from its operative associated relation to the clip frame before drying the films. If this is desired, it may easily be accomplished by loosening the break-joint or coupling means 33 holding one end of the crossbar 29, then turning upward the latter from its pivoted end, so that the separator frame with the separator rods may be dropped downwardly away from and wholly detached from the clip frame.

From the above description it will be clearly evident, that my novel construction of carrier involves many advantages in aiding the operations of developing expeditiously a large number of film strips at one time. Owing to its extensible character, the rows of clips 11 may be initially widely separated, so as to render comparatively easy and quick the manipulation of each individual clip when attaching a film thereto, without obstruction to the operator's hands by adjacent parts of the frame; and yet when the clip frame is closed the film strips are compacted comparatively close together so that a maximum number of film strips may be submerged in a developing tank at one time, and by simple manipulations. The separator frame with its separator rods is of great advantage, in that the movement permitted to the rods will quickly separate adhering film strips and remove air-bells and bubbles therefrom, thus permitting a much closer spacing of film strips within the developing tank than ordinarily would be practical.

In some cases, where amateur finishing plants are equipped with extra large developer, fixing bath and washing tanks, it is entirely feasible to omit the use of the separator frame and its separator rods, using the clip frame alone. Even in such cases the advantages of the extensible clip frame, from the film attaching standpoint will be readily conceded. I consider my invention, therefore, sufficiently broad to include and I intend to claim the use of the extensible clip frame either with or without the separator frame.

I am aware that changes may be made in the general arrangements and combinations of the various devices and parts, as well as in the details of the construction of the same, without departing from the scope of this invention as set forth in the foregoing specification, and as defined in the appended claims. Hence, I do not limit this invention to the exact arrangements and combinations of the various devices and parts as described in said specification, nor do I confine myself to the exact details of the construction of the said parts, as illustrated in the accompanying drawings.

I claim:—

1. In a device of the kind described, a frame having longitudinally extensible side members, transverse supporting rods between said side members and supported by the latter so as to be comparatively widely separated one from another when said side members are opened to expanded position, and a plurality of film gripping devices connected with each supporting rod.

2. In a device of the kind described, a frame having longitudinally extensible side members, transverse supporting rods between said side members and supported by the latter so as to be comparatively widely separated one from another when said side members are opened to expanded position, a plurality of film gripping devices connected with each supporting rod, and means for securing said frame in normally closed condition.

3. In a device of the kind described, a frame comprising extensible side members formed of diagonal crossed levers pivoted together at the middle and at the ends, transverse supporting rods between the lower edge joints of said side members, and a plurality of film gripping devices connected with each supporting rod.

4. In a device of the kind described, a frame comprising extensible side members formed of diagonal crossed levers pivoted together at the middle and at the ends, transverse supporting rods between the lower edge joints of said side members, a plurality of film gripping devices connected with each supporting rod, transverse tie rods interconnecting the ends of said side members, said tie rods having outwardly projecting portions providing suspension arms, and means intermediate said tie rods and engageable therewith to hold said frame in normal contracted position.

5. In a device of the kind described, a frame comprising extensible side members formed of diagonal crossed levers pivoted together at the middle and at the ends, transverse supporting rods between the lower edge joints of said side members, a plurality of film gripping devices connected with each supporting rod, transverse tie rods interconnecting the ends of said side members, said tie rods having outwardly projecting portions providing suspension arms, a lifting frame intermediate said tie rods, hook-plates at the ends of said lifting frame engageable with said tie rods, and an eye-piece connected with said lifting frame to receive the attachment of hoisting means.

6. In a device of the kind described, a carrier comprising a clip frame having longitudinally spaced transverse supporting rods provided with film gripping clips, a separator frame having longitudinally spaced transverse separator rods, said clip frame and said separator frame being so related in association that the separator rods of the latter are positioned intermediate the clip supporting rods of the former, and means for raising and lowering said separator frame relative to said clip frame.

7. In a device of the kind described, a carrier comprising a longitudinally extensible clip frame having spaced transverse supporting rods provided with film gripping clips, a longitudinally extensible separator frame having spaced transverse separator rods, said clip frame and said separator-frame being so related in association that the separator rods of the latter are positioned intermediate the clip supporting rods of the former, means for suspending said clip frame in operative relation to a tank, said separator frame being vertically movable relative to said clip frame, and upwardly extending side rods connected with said separator frame for actuating the vertical movements thereof.

8. In a device of the kind described, a carrier comprising a longitudinally extensible clip frame having spaced transverse supporting rods provided with film gripping clips, a longitudinally extensible separator frame having spaced transverse separator rods, said clip frame and said separator frame being so related in association that the separator rods of the latter are positioned intermediate the clip supporting rods of the former, means for suspending said clip frame in operative relation to a tank, said separator frame being vertically movable relative to said clip frame, upwardly extending side rods connected with said separator frame for actuating the vertical movements thereof, means engageable with said clip frame when closed adapted to receive the attachment of hoisting means, and means for retaining said separator frame in suspended relation to said clip frame when the latter is hoisted.

9. In a device of the kind described, a clip frame comprising extensible side members formed of diagonal crossed levers pivoted together at the middle and at the ends, transverse supporting rods between the lower edge joints of said side members, a plurality of film gripping clips connected with each supporting rod, transverse tie rods interconnecting the ends of said side members, said tie rods having outwardly projecting portions providing suspension arms, a lifting frame intermediate said tie rods, hook plates at the ends of said lifting frame engageable with said tie rods, an eye-piece connected with said lifting frame to receive the attachment of hoisting means, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, said separator frame being vertically movable relative to said clip frame, and upwardly extending side rods connected with said separator frame for actuating the vertical movements thereof.

10. In a device of the kind described, a clip frame comprising extensible side members formed of diagonal crossed levers pivoted together at the middle and at the ends, transverse supporting rods between the lower edge joints of said side members, a plurality of film gripping clips connected with each supporting rod, transverse tie rods interconnecting the ends of said side members, said tie rods having outwardly projecting portions providing suspension arms, a lifting frame intermediate said tie rods, hook plates at the ends of said lifting frame engageable with said tie rods, an eye-piece connected with said lifting frame to receive the attachment of hoisting means, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, said separator frame being vertically movable relative to said clip frame, upwardly extending side rods connected with said separator frame for actuating the vertical movements thereof, a cross bar interconnected with said side rods adjacent to the upper ends of the latter, and means connected with said lifting frame for engaging said cross bar to retain said separator frame in suspended relation to said clip frame when the latter is hoisted.

11. In a device of the kind described, a clip frame comprising extensible side members formed of diagonal crossed levers pivoted together at the middle and at the ends, transverse supporting rods between the lower edge joints of said side members, a plurality of film gripping clips connected with each supporting rod, transverse tie rods interconnecting the ends of said side members, said tie rods having outwardly projecting portions providing suspension arms, a lifting frame intermediate said tie rods, hook plates at the ends of said lifting frame engageable with said tie rods, an eye-piece connected with said lifting frame to receive the attachment of hoisting means, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, said separator frame being vertically movable relative to said clip frame, upwardly extending side rods connected with said separator frame intermediate its ends so as to be capable of an axial swiveling movement, slide blocks on said side rods, oppositely extending outrigger links pivotally interconnected between outlying points of said separator frame and said slide blocks, and suspension projections on said side rods adjacent the lower ends of the same.

12. In a device of the kind described, a clip frame comprising extensible side members formed of diagonal crossed levers pivoted together at the middle and at the ends, transverse supporting rods between the lower edge joints of said side members, a plurality of film gripping clips connected with each supporting rod, transverse tie rods interconnecting the ends of said side members, said tie rods having outwardly projecting portions providing suspension arms, a lifting frame intermediate said tie rods, hook plates at the ends of said lifting frame engageable with said tie rods, an eye-piece connected with said lifting frame to receive the attachment of hoisting means, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, said separator frame being vertically movable relative to said clip frame, upwardly extending side rods connected with said separator frame intermediate its ends so as to be capable of an axial swiveling movement, slide blocks on said side rods, oppositely extending outrigger links pivotally interconnected between outlying points of said separator frame and said slide blocks, and suspension projections on said side rods adjacent the lower ends of the same, a cross bar interconnected with said side rods adjacent to the upper ends of the latter, and means connected with said lifting frame for engaging said cross bar to retain said separator frame in suspended relation to said clip frame when the latter is hoisted.

13. In a device of the kind described, a clip frame comprising extensible side members formed of diagonal crossed levers pivoted together at the middle and at the ends, transverse supporting rods between the lower joints of said side members, a plurality of film gripping clips connected with each supporting rod, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, means for suspending said clip frame in operative relation to a tank, said separator frame being vertically movable relative to said clip frame, and upwardly extending side rods connected with said separator frame for actuating the vertical movements thereof.

14. In a device of the kind described, a clip frame comprising extensible side members formed of diagonal crossed levers pivoted together at the middle and at the ends, transverse supporting rods between the lower joints of said side members, a plurality of film gripping clips connected with each supporting rod, a separator frame comprising extensible side members formed of diagonal crossed levers pivoted together at the middle and at the ends, transverse separator rods between the lower edge joints of said separator frame side members, said clip frame and said separator frame being so related in association that the separator rods of the latter are positioned intermediate the clip supporting rods of the former, means for suspending said clip frame in operative relation to a tank, said separator frame being vertically movable relative to said clip frame, upwardly extending side rods connected with said separator frame for actuating the vertical movements thereof, means engageable with said clip frame when closed adapted to receive the attachment of hoisting means, and means for retaining said separator frame in suspended relation to said clip frame when the latter is hoisted.

15. The combination with a photographic film carrier comprising a clip frame and a separator frame vertically movable relative to said clip frame, of a loading rack comprising parallel rack rails for supporting said clip frame and said separator frame in parallel horizontal disposition wherein the clips of the former are suspended in a plane beneath the separators of the latter, vertically movable elevator rails associated with said rack rails to engage said clip frame, and means for raising said elevator rails to lift said clip frame relative to said separator frame after the former is loaded whereby the clips of the clip frame are lifted above the separator of the separator frame.

16. The combination with a photographic film carrier comprising a clip frame and a separator frame vertically movable relative to said clip frame, of a loading rack comprising parallel rack rails for supporting said clip frame and said separator frame in parallel horizontal disposition wherein the clips of the former are suspended in a plane beneath the separators of the latter, vertically movable elevator rails engageable with said clip frame, upwardly extending guides connected with said rack rails with which said elevator rails are movably associated, toggle lever means interconnecting said elevator rails with said rack rails, lift bars for actuating said toggle lever means, and means for raising said lift bar to transmit through said toggle lever means an upward movement to said elevator rails whereby said clip frame is lifted relative to said separator frame after the former is loaded thereby lifting the clips of said clip frame above the separators of said separator frame.

17. The combination with a photographic film carrier comprising a longitudinally extensible clip frame having spaced transverse supporting rods provided with film gripping clips and a longitudinally extensible separator frame having spaced transverse separator rods for alternated disposition relative to said clip supporting rods of the clip frame, said clip and separator frames being vertically movable in relation one to the other, of a loading rack comprising parallel rack rails for supporting said clip and separator frames in open extended and parallel horizontal disposition wherein the clips of the former are suspended in a plane beneath the separator rods of the latter, vertically movable elevator rails associated with said rack rails to engage said clip frame, and means for raising said elevator rails to lift said clip frame relative to said separator frame before closing up the same after loading whereby the clips of the former are lifted above the separator rods of the latter.

18. The combination with a photographic film carrier comprising a longitudinally extensible clip frame having spaced transverse supporting rods provided with film gripping clips and a longitudinally extensible separator frame having spaced transverse separator rods for alternated disposition relative to said clip supporting rods of the clip frame, said clip and separator frames being vertically movable in relation one to the other, of a loading rack comprising parallel rack rails for supporting said clip and separator frames in open extended and parallel horizontal disposition wherein the clips of the former are suspended in a plane beneath the separator rods of the latter, vertically movable elevator rails associated with said rack rails to engage said clip frame, upwardly extending guides on which said elevator rails ride, toggle lever means interconnecting said elevator rails with said rack rails, lift bars for actuating said toggle lever means, and means for raising said lift bars to transmit through said toggle lever means an upward movement to said elevator rails whereby said clip frame is lifted relative to said separator frame before closing up the same after loading whereby the clips of the former are lifted above the separator rods of the latter.

In testimony, that I claim the invention set forth above I have hereunto set my hand this 12th day of September 1921.

ANTHONY A. BARBER.

Witnesses:
FREDK. C. FRAENTZEL,
EVA E. DESCH.